UNITED STATES PATENT OFFICE.

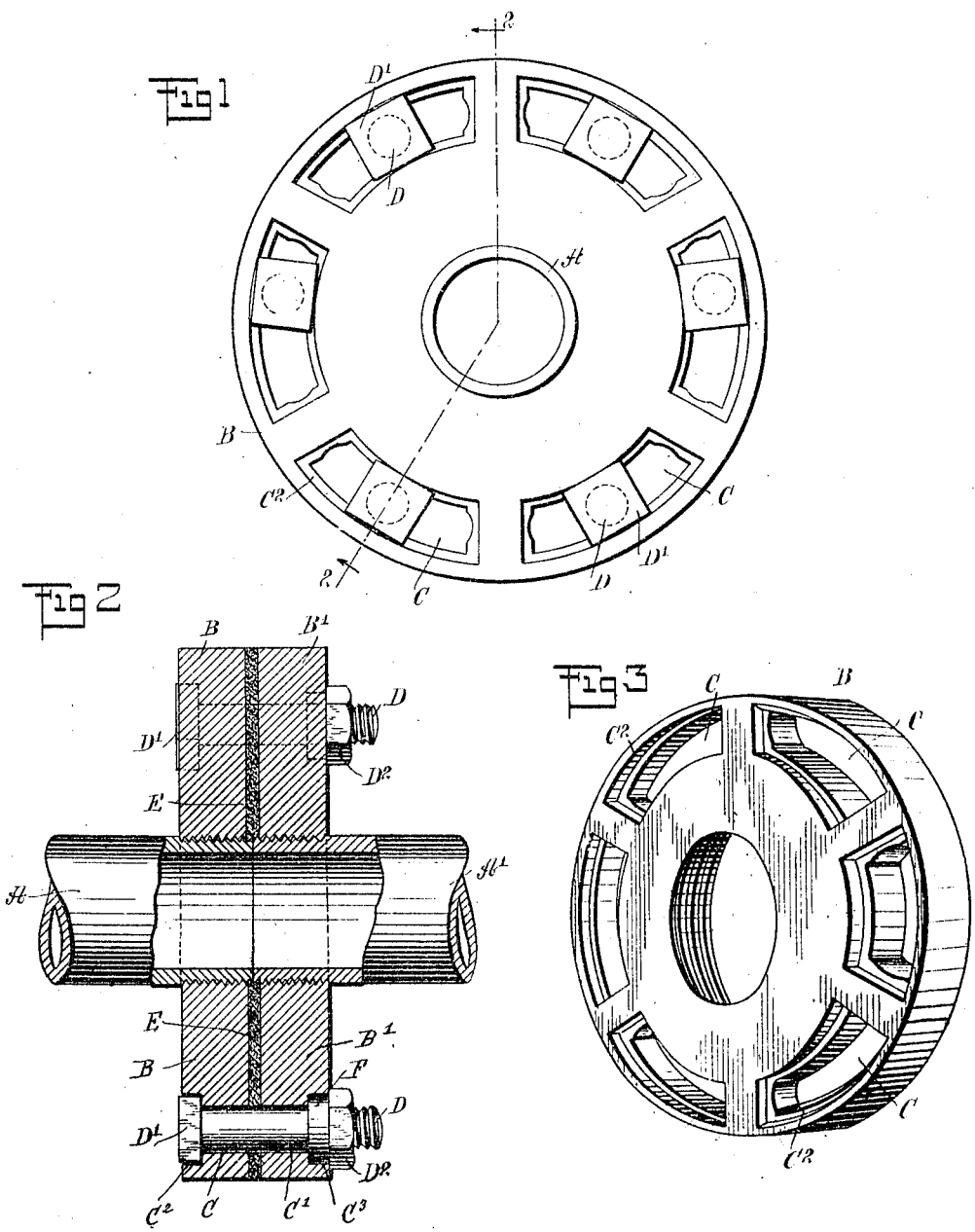

JOSEPH MATTHEWS, OF NEWBURYPORT, MASSACHUSETTS.

PIPE-COUPLING.

992,022.

Specification of Letters Patent.

Patented May 9, 1911.

Application filed April 30, 1910. Serial No. 558,694.

*To all whom it may concern:*

Be it known that I, JOSEPH MATTHEWS, a citizen of the United States, and a resident of Newburyport, in the county of Essex and State of Massachusetts, have invented a new and Improved Pipe-Coupling, of which the following is a full, clear, and exact description.

The object of the invention is to provide a new and improved pipe coupling, arranged to insure quick and accurate bolting together of the coupling flanges after the latter have been screwed in position on the adjacent threaded ends of the pipes to be coupled, and to prevent the bolts from turning and loosening the flanges.

For the purpose mentioned, use is made of flanges adapted to screw on the adjacent ends of the pipes to be coupled, the flanges having registering slots arranged in a circle, the slots being enlarged at the outer faces of the flanges, and bolts adapted to pass through the registering slots, the head of each bolt fitting into the enlarged slot portion to hold the bolt from turning.

A practical embodiment of the invention is represented in the accompanying drawings forming a part of this specification, in which similar characters of reference indicate corresponding parts in all the views.

Figure 1 is a face view of the pipe coupling as applied; Fig. 2 is a sectional side elevation of the same on the line 2—2 of Fig. 1; and Fig. 3 is a perspective view of one of the coupling flanges.

The pipes A and A' to be coupled together are provided at their adjacent ends with the usual screw threads on which screw the threaded portions of the flanges B and B', provided with segmental slots C, C', arranged in a circle and through which pass the bolts D for fastening the flanges B and B' together, a suitable packing or a gasket E being arranged between the flanges B and B' to prevent leakage of the fluid passing through the coupled pipes A and A'. The outer portions $C^2$, $C^3$ of the slots C and C' are enlarged, as plainly indicated in the drawings, the outer portions $C^2$ being adapted to receive the heads D' of the bolts D, to hold the bolts against turning, and the enlarged slot portions $C^3$ of the slots C' are adapted to receive washers F, against which screw the nuts $D^2$ of the bolts D, as plainly indicated in Fig. 2.

In using the coupling, the flanges B and B' are screwed onto the threaded ends of the pipes A and A', and then the flanges are brought together and the bolts D are passed through the slots C, C', which, on account of being elongated, register with each other, so that the bolts D can be passed through the registering slots to fasten the flanges B and B' together. The heads D' of the bolts D engage the enlarged slot portions of one flange while the washers F under the nuts $D^2$ engage the enlarged slot portions of the other flange. From the foregoing, it will be seen that by the arrangement described it is not necessary to screw the flanges B and B' forward or backward until the ordinary round bolt holes are in register with each other, and consequently the flanges B and B' can be screwed up first to their proper places on the threaded ends of the pipes A and A', and then the flange can be fastened together by the bolts D, as above described. Thus considerable time is saved in coupling the pipes A and A' together, and as the bolts D are held against turning, it is evident that the flanges B and B' are not liable to jar loose.

It is understood that for couplings for small pipes the number of slots and bolts D is diminished, while for larger couplings more slots and bolts are required, and by having the slots C, C' elongated no extra drilling, chipping or otherwise enlarging ordinary bolt holes is required. It is further evident that by having the slots C, C' arranged in a circle the same distances from the axis of the flanges, the slots will always be in register and consequently permit convenient insertion and screwing up of the bolts to fasten the flanges together.

Having thus described my invention, I claim as new and desire to secure by Letters Patent:

In a pipe coupling, the combination with two pipes having their adjacent ends screw-threaded, of two disk-shaped flanges having bores threaded throughout their length and screwing onto the threaded ends of the pipes with the ends of the said pipes approximately flush with the inner faces of the flanges, each flange being provided with registering segmental slots concentric with the bore thereof, the outer sides of the slots of each flange being enlarged, bolts extending through the said slots with their heads in the enlarged portions of the slots of one flange, washers on the bolts in the enlarged portions of the slots of the other flange, and nuts on said bolts.

In testimony whereof I have signed my name to this specification in the presence of two subscribing witnesses.

JOSEPH MATTHEWS.

Witnesses:
　JOHN O'CONNELL,
　ARTHUR P. O'LOAN.